United States Patent

Bomya

[11] Patent Number: 6,002,323
[45] Date of Patent: Dec. 14, 1999

[54] AUDIBLE FEEDBACK APPARATUS FOR INDICATING OPERATION AND POSITION OF A MOVABLE ELEMENT

[75] Inventor: Timothy J. Bomya, Westland, Mich.

[73] Assignee: Lear Automotive Dearborn, Inc., Southfield, Mich.

[21] Appl. No.: 08/948,121

[22] Filed: Oct. 9, 1997

[51] Int. Cl.⁶ .................................................. G08B 3/00
[52] U.S. Cl. .................................. 340/384.1; 340/686.1; 340/691.7; 340/392.1; 318/483; 318/DIG. 2; 15/250.17
[58] Field of Search ........................ 340/384.1, 686.1, 340/691.7, 691.1, 392.1, 392.2, 398.1, 398.2, 392.4, 392.5; 116/88; 84/173; 318/444, 483, DIG. 2; 15/250.17

[56] References Cited

U.S. PATENT DOCUMENTS

| Re. 33,813 | 2/1992 | von der Heide et al. . |
|---|---|---|
| 1,057,461 | 4/1913 | Schaefer .............................. 340/392.1 |
| 2,345,778 | 4/1944 | Lammeren et al. . |
| 2,659,237 | 11/1953 | Wood . |
| 2,953,802 | 9/1960 | Ziegler . |
| 3,163,791 | 12/1964 | Carlson . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,574,882 | 4/1971 | Petry . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,705,520 | 12/1972 | Carpenter . |
| 3,803,627 | 4/1974 | Schuscheng . |
| 3,913,084 | 10/1975 | Bollinger et al. . |
| 3,917,330 | 11/1975 | Quantz . |
| 3,927,436 | 12/1975 | Inoue et al. . |
| 3,947,814 | 3/1976 | Allen ....................................... 340/692 |
| 4,009,952 | 3/1977 | Badalich et al. . |

(List continued on next page.)

FOREIGN PATENT DOCUMENTS

| 0 632 428 | 1/1995 | European Pat. Off. . |
|---|---|---|
| 1281424 | 12/1961 | France . |
| 822 178 | 11/1951 | Germany . |
| 3807087 A1 | 9/1989 | Germany . |
| 39 23 688 | 1/1991 | Germany . |
| 43 13 363 A1 | 11/1993 | Germany . |
| 43 37 760 | 5/1994 | Germany . |
| 56-22150 | 2/1981 | Japan . |
| 5-86761 | 4/1993 | Japan . |
| 8203741 | 4/1984 | Netherlands . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Shihlin Electric & Engineering Corp.–Automobile Parts Internet Website, WWW.seec.com.tw/eng/a–100.htm, May 14, 1999.
International Search Report for PCT/US98/12665, 4 pages.
Japanese Patent Abstract for Publication No. 05338507 published Dec. 21, 1993.

(List continued on next page.)

*Primary Examiner*—Nina Tong
*Attorney, Agent, or Firm*—Harness, Dickey & Pierce, P.L.C.

[57] ABSTRACT

The present invention provides an element being driven by an electromagnetic device. According to the invention, the element is in mechanical communication with a noise producing device which produces noise by mechanical means. Therefore, the noise producing device produces noise indicating movement of the movable body. In another aspect of the present invention, the noise producing device may produce noise by mechanical means which indicates a position of the movable body.

18 Claims, 5 Drawing Sheets

U.S. PATENT DOCUMENTS

| | | | |
|---|---|---|---|
| 4,158,159 | 6/1979 | Orris et al. | |
| 4,173,055 | 11/1979 | Izumi et al. | 15/250.02 |
| 4,183,114 | 1/1980 | Eden . | |
| 4,259,624 | 3/1981 | Seibicke . | |
| 4,271,381 | 6/1981 | Munz et al. | |
| 4,309,646 | 1/1982 | Liedtke et al. | |
| 4,315,170 | 2/1982 | Penn | 310/39 |
| 4,326,355 | 4/1982 | Watanabe . | |
| 4,336,482 | 6/1982 | Goertler et al. | |
| 4,352,299 | 10/1982 | Riggs et al. | |
| 4,405,887 | 9/1983 | Tamura et al. | 318/443 |
| 4,422,522 | 12/1983 | Slavin et al. | |
| 4,434,678 | 3/1984 | Maus . | |
| 4,492,904 | 1/1985 | Graham . | |
| 4,553,656 | 11/1985 | Lense . | |
| 4,573,723 | 3/1986 | Morita et al. | |
| 4,639,065 | 1/1987 | Kohler et al. | |
| 4,660,698 | 4/1987 | Miura . | |
| 4,674,781 | 6/1987 | Reece et al. | |
| 4,701,149 | 10/1987 | Breil | 446/404 |
| 4,701,972 | 10/1987 | Saito . | |
| 4,702,117 | 10/1987 | Tsutsumi et al. | |
| 4,724,760 | 2/1988 | Bubley . | |
| 4,733,147 | 3/1988 | Muller et al. | |
| 4,783,600 | 11/1988 | Chang | 307/116 |
| 4,793,640 | 12/1988 | Stewart, Sr. | |
| 4,878,398 | 11/1989 | Heinrich . | |
| 4,885,512 | 12/1989 | Gille et al. | |
| 4,893,039 | 1/1990 | Isii . | |
| 4,918,272 | 4/1990 | Nishikawa . | |
| 5,007,131 | 4/1991 | Chevalier et al. | |
| 5,023,530 | 6/1991 | Ohashi et al. | |
| 5,045,741 | 9/1991 | Dvorsky . | |
| 5,063,317 | 11/1991 | Bruhn . | |
| 5,182,957 | 2/1993 | Bohmer et al. | |
| 5,218,255 | 6/1993 | Horiguchi . | |
| 5,222,775 | 6/1993 | Kato . | |
| 5,228,239 | 7/1993 | Heo . | |
| 5,251,114 | 10/1993 | Cantin et al. | |
| 5,274,875 | 1/1994 | Chou . | |
| 5,274,876 | 1/1994 | Wehrspann | 15/250.17 |
| 5,291,109 | 3/1994 | Peter . | |
| 5,333,351 | 8/1994 | Sato . | |
| 5,355,061 | 10/1994 | Forhan . | |
| 5,355,286 | 10/1994 | Flint . | |
| 5,371,802 | 12/1994 | McDonald et al. | |
| 5,440,186 | 8/1995 | Forsell . | |
| 5,485,044 | 1/1996 | MacKay . | |
| 5,519,258 | 5/1996 | Stroven et al. | |
| 5,694,812 | 12/1997 | Maue et al. | |
| 5,760,319 | 6/1998 | Dickinson | 84/173 |
| 5,844,382 | 12/1998 | Dan . | |

OTHER PUBLICATIONS

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

"Kinematic Analysis of Mechanisms",1959, J.E. Shigley, pp. 228–231.

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, "Mechanisms for Intermittent Motion, Part 2", Jan. 1952, Otto Lichtwitz, pp. 127–141.

Machine Design, "Mechanisms for Intermittent Motion, Part 3", Feb. 1952, Otto Lichtwitz, pp. 146–155.

Machine Design, "Mechanisms for Intermittent Motion, Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

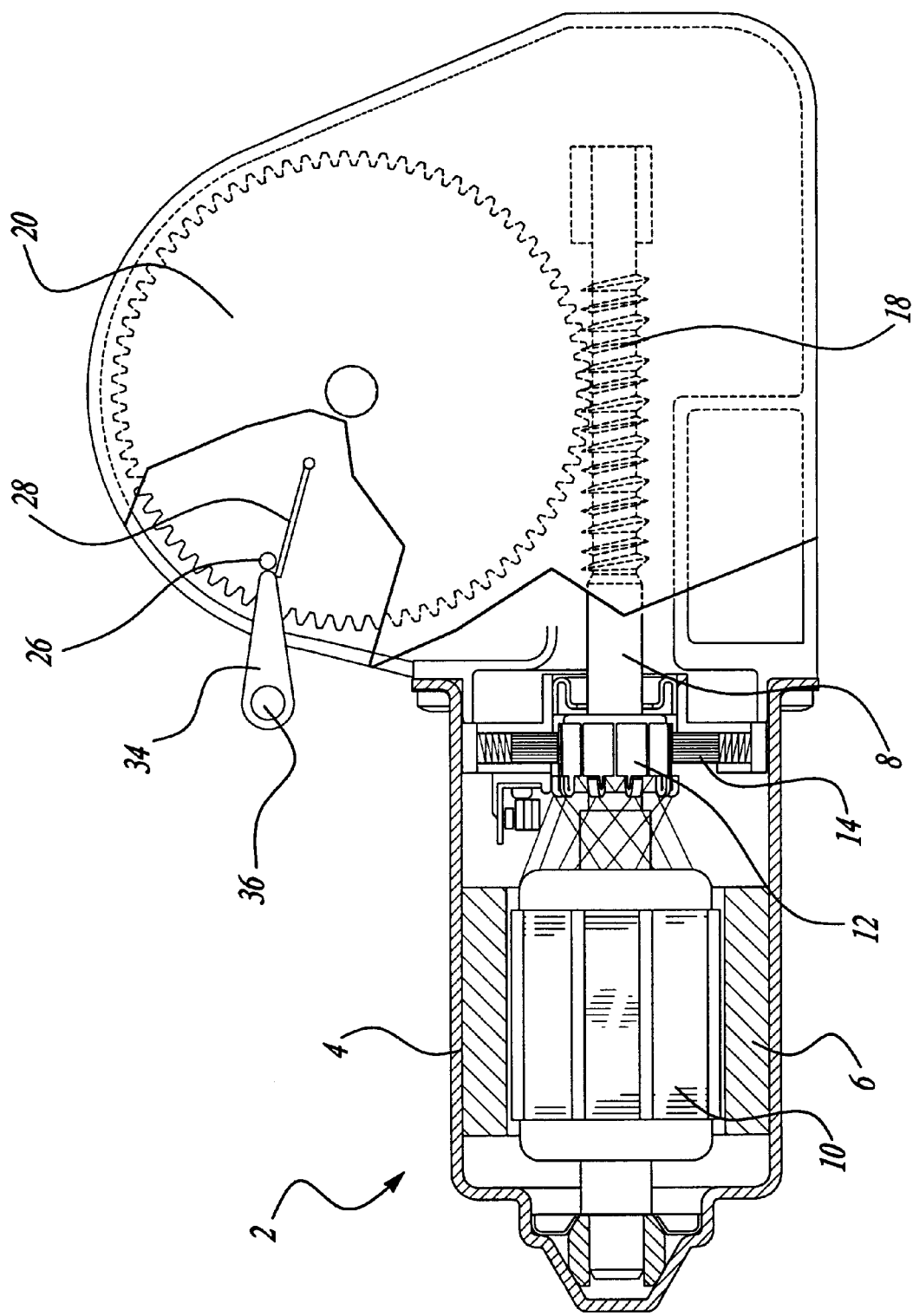

AUDIBLE FEEDBACK APPARATUS FOR INDICATING OPERATION AND POSITION OF A MOVABLE ELEMENT

BACKGROUND OF THE INVENTION

This invention relates generally to feedback apparatuses and specifically to an audible feedback apparatus that employs mechanical means to indicate the operation and positioning of a movable element.

Many machines employ mechanical devices where it is important to determine whether the device is operating and what the position of the device is objectionable noise in operating electric motors has traditionally been a problem. Accordingly, many attempts have been made to reduce the noise of such electric motors. For example, reference should be made to U.S. Pat. No. 5,440,186, entitled "Motor With Isolated Brush Card Assembly" which issued to Forsell et al. on Aug. 8, 1995, and U.S. Pat. No. 5,485,044, entitled "Motor With End Play Insert" which issued to Mackay et al. on Jan. 16, 1996. Accordingly, with advancing motor technology, sound generation of the motor device is becoming increasingly quieter. Therefore, a user may not be able to hear or determine whether or not a wiper is actually functioning or a lock mechanism is locking. This is problematic when remote key for door lock devices are used since the vehicle operator cannot be certain if the vehicle doors are locked. Thus, it is desirable to have some means to determine these activating characteristics.

It is sometimes important to provide a feedback system which tells a user whether the wiper is in either end of a wipe stroke or at a park position, for instance, in automobiles employing wiper systems driven by motors. Conventional technology employed electrical feedback systems which electrically fed information indicative of the position of a rotational device to a microprocessor, whereby the microprocessor would electronically supply audio sounds indicating the position of the device, such as by electronic beeps, chimes or even through visual displays. However, these electrical devices have some shortcomings.

Conventional electronic feedback systems may be unreliable and untrustworthy in harsh conditions because of the intricacy of the electrical devices. Extreme temperatures, oil or grease, and other adverse environmental conditions may wear or contaminate the electrical mechanism thereby causing the devices to fail. Furthermore, the use of an electrical system, in lieu of a mechanical system, dramatically increases the cost of components and manufacturing while also increasing the energy requirements for the system as a whole.

SUMMARY OF THE INVENTION

In accordance with the present invention, the preferred embodiment audio feedback apparatus incorporates an element being driven by an electromagnetic device. The element is in mechanical communication with a noise producing device which produces noise by mechanical means. Therefore, the noise producing device produces noise indicating movement of a movable body. In another aspect of the present invention, a noise producing device produces an artificial noise by mechanical means which indicates a position of a movable body. In still another aspect of the present invention, an electromagnetic device can be an electric motor coupled to a door latch and/or a window wiper. The audible feedback apparatus of the present invention is advantageous over conventional systems since the present invention employs simple mechanical components which are resilient to adverse environmental conditions. Therefore, the present invention would hardly be affected by the potential failure mode which affects traditional advanced electrical devices operating in extreme conditions. Furthermore, because of the mechanical simplicity, the present invention significantly reduces the piece cost, assembly cost, part proliferation and handling costs, wearing costs and battery current consumption as compared to conventional constructions. Also, the audible feedback apparatus of the present invention significantly reduces weight and packaging space requirements while increasing the reliability of the system. Moreover, the mechanical device of the present invention advantageously employs predominantly already existing components and is ideally suited for use with a remotely controlled multi-functional electric motor system. Additional advantages and features of the present invention will become apparent from the following description and appended claims, taken in conjunction with the accompanying drawings.

BRIEF DESCRIPTION OF THE DRAWINGS

FIG. 5 is a rear elevational view of the preferred embodiment of the audible feedback apparatus in accordance with the present invention.

DETAILED DESCRIPTION OF THE PREFERRED EMBODIMENT

Figure 6:
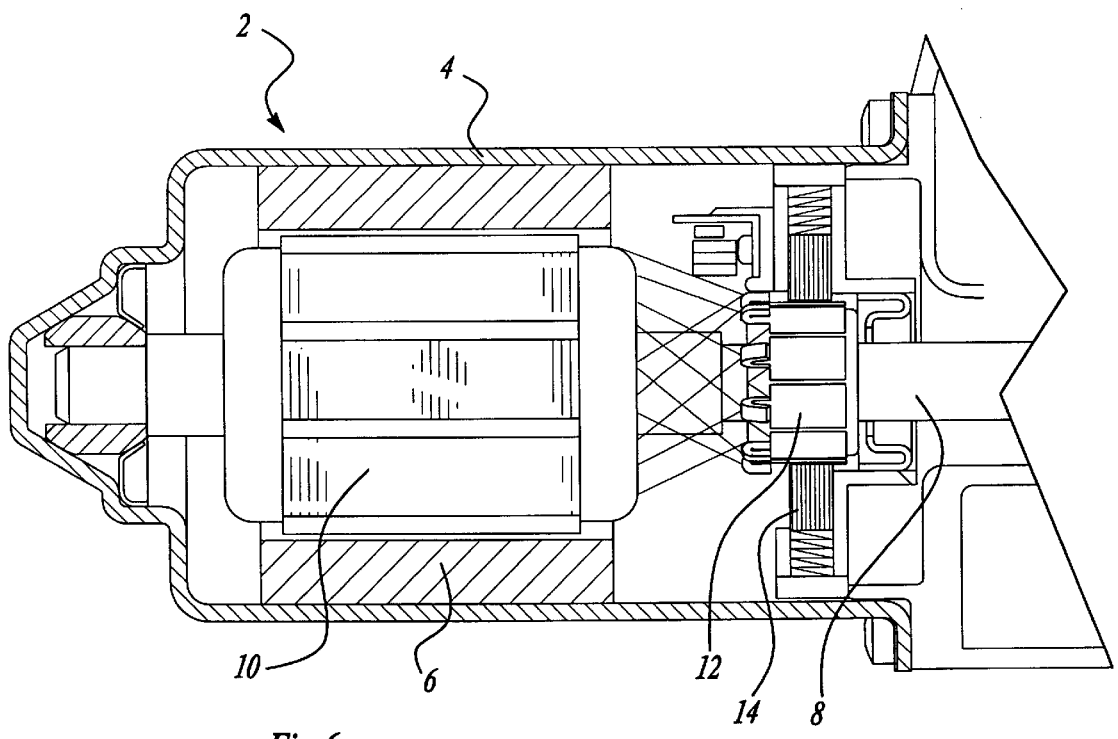
FIG. 6 is a rear elevational view showing an electromagnetic device of the preferred embodiment of the audible feedback apparatus, in accordance with the present invention.

The construction of a central drive and power transmission unit is illustrated in FIG. 6. An electric motor 2 is shown as being of a 12 volt fractional horsepower, dc electromagnetic variety. Stationary permanent magnets 6, a rotatable armature 10 with wire windings, a rotatable armature shaft 8 joined to armature 10, a commutator 12 electrically connected to the wire windings and rotatable with armature shaft 8, a brush card assembly 14 and various electronic components, bushings and retainers are located in a metallic motor housing 4. It will be appreciated that other electric motor constructions can alternately be substituted for that shown. A worm gear segment 18 is provided upon a portion of armature shaft 8 extending beyond motor housing.

A gear housing 16 is also provided for receiving worm gear segment 18 (shown in FIG. 1) and the immediately adjacent portions of armature shaft 8. A main worm gear 20 is also housed and rotatably journalled within gear housing 16. Gear housing 16 is preferably made from cast aluminum or any other material suitable for mechanical application.

Figure 1:
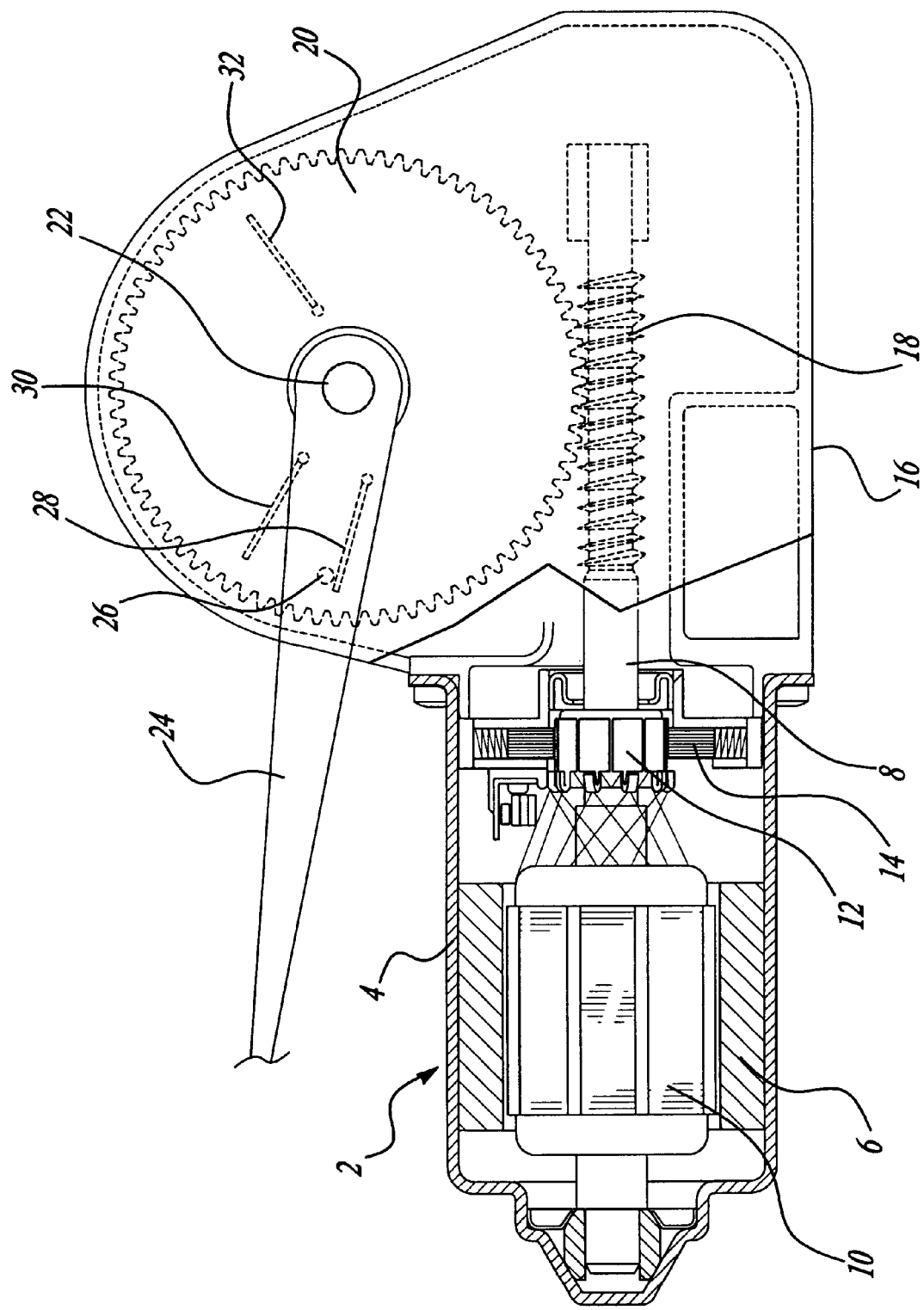
FIG. 1 is a rear elevational view showing the preferred embodiment of the audible feedback apparatus, employing a wiper arm in a parked position, in accordance with the present invention.

As shown in FIG. 1, a first embodiment is illustrated which shows worm gear 20 being rigidly attached to shaft 22 which is in turn attached to wiper assembly 24. Shaft 22 penetrates housing 16 and is preferably supported by bearings or other device allowing rotation of the shaft. An interface pin 26 protrudes from a surface of worm gear 20 and is preferably located at the same angular position with respect to the axis of worm gear which coincides with wiper 24. Pin 26 may be a bolt, stud, screw, molded appendage or any other suitable means for creating a protruding member from worm gear (20).

Figure 4:
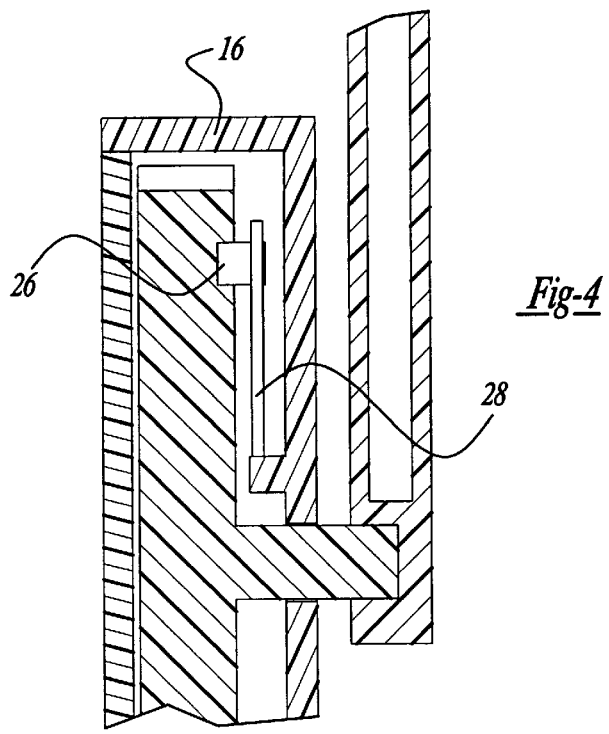
FIG. 4 is a fragmentary cross-sectional view, taken along line 4—4 of FIG. 2, showing the preferred embodiment of the audible feedback apparatus in accordance with the present invention.

FIG. 4 shows a proximal end of a music box finger 28 being fixed to an internal face of housing 16. The fixation may be achieved by use of a bolt, weld or any other suitable device which rigidly fixes one end of the music box finger to the housing. Preferably, the opposite distal end of the music box finger extends to a position intersecting the path of travel of pin 26 due to rotation of worm gear 20. Music box finger 28 is preferably radially oriented such that it is perpendicular to a cord of the circular path of travel of pin 26, at the point of intersection of music box finger 28 and pin 26. Music box finger 28 is preferably made of flexible spring steel having a modulus of elasticity and length which provides a predetermined, desirable audible resonant frequency or sound when pin 26 strikes or "plucks" music box finger 28. Alternately, pin 26 and finger 28 may be located on any rotational or linearly moving element of a power train in mechanical communication with the worm gear or other moving element of interest.

The operation of the audible feedback apparatus will now be discussed. In a first preferred embodiment of the present invention, as shown in FIG. 5, motor 2 is in operation which propels pin 26 along a circular clockwise path intersecting with finger 28. When pin 26 impacts finger 28, finger 28 is bent, released and allowed to resonate. By this resonation, finger 28 emits an audible sound. Each revolution of gear 20 driven by motor 2 causes another emission of an audible sound generated by finger 28. As a result, a listener is audibly informed by the audible sound that worm gear 20 is rotating.

In a second embodiment, as shown in FIG. 1, the music box fingers are used to audibly indicate various positions of an attached accessory. Typical accessories follow a cycle of operation. For example, a window wiper starts in a parked position and then is activated to wipe a window in a back and forth oscillating manner, the wiper is then returned to a park or depressed position. Similarly, vehicle locks or latches, such as found on vehicle tailgates, are operated to lock and unlock, or latch and unlatch the tailgate door. These accessories are coupled to worm gear 20 by intermittent motion mechanisms and a multi-functional motor as are disclosed in PCT publication numbers WO 96/33891 and WO 96/33892 respectively entitled "Multi-Functional Apparatus Employing an Intermittent Motion Mechanism Control" and "System for an Automotive Vehicle Multi-Functional Apparatus"; these are incorporated by reference herein. This type of operation can be characterized as a cycle.

Figure 2:
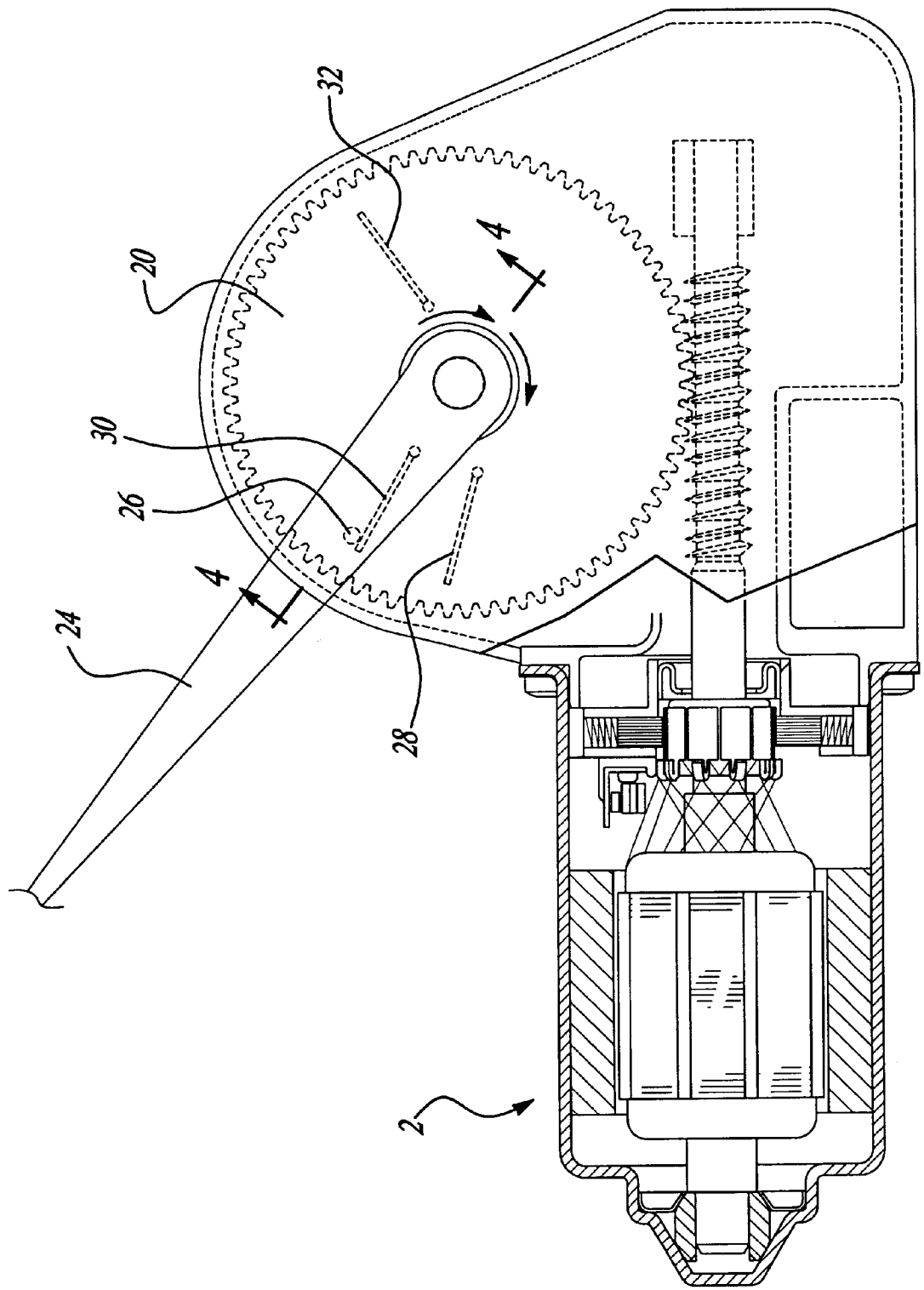
FIG. 2 is a rear elevational view showing the preferred embodiment of the audible feedback apparatus, employing the wiper arm at the beginning of a wipe position, in accordance with the present invention.
Figure 3:
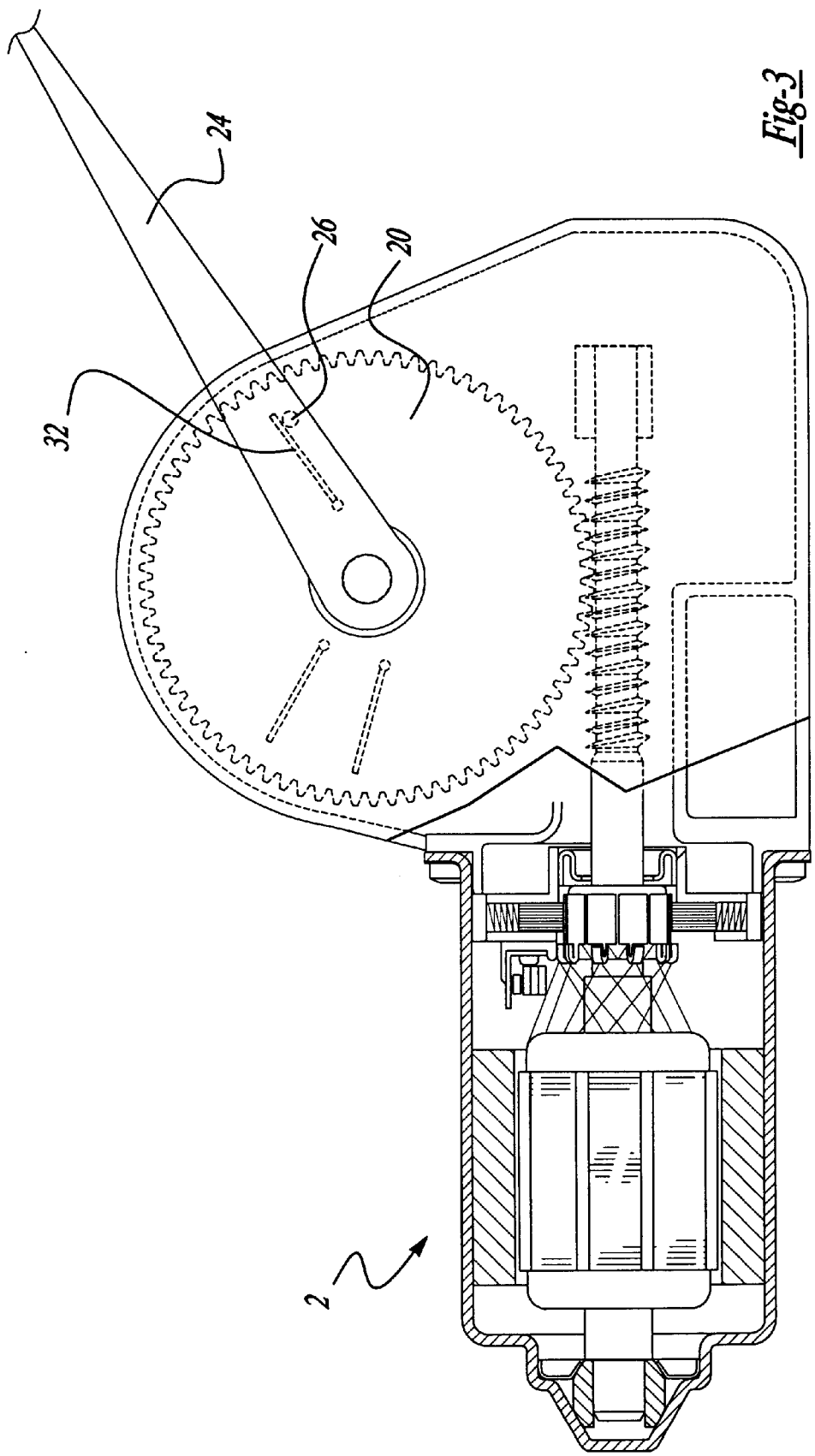
FIG. 3 is a rear elevational view showing the preferred embodiment of the audible feedback apparatus, employing a wiper arm at the end of the wipe position, in accordance with the present invention.

As shown in FIG. 1, a plurality of fingers are attached to strategic positions on the internal side of housing 16. In this Figure, wiper is first shown in a park position. At this point, pin 26 is adjacent to music box finger 28. When motor 2 is instructed to drive worm gear 20 clockwise and thereby operate wiper 24 as shown in FIG. 2, pin 26 travels from the park position to a beginning of a stroke position (as shown in FIG. 2); thus, pin 26 impacts music box finger 30. Music box finger 30 is bent, released, and then allowed to resonate. Since the resonant frequency of this music box finger is audible to an ear, a listener close enough to hear the resonance will be able to determine that the wiper has been moved to the beginning of its stroke position. This is especially advantageous for a rear door wiper, since the driver is informed of the wiper's operation without glancing from the road. FIG. 3 shows motor 2 driving worm gear 20 and, thus, wiper 24 to the end of the wiper stroke where pin 26 intersects music box finger 32. This action causes bending, releasing and resonating of music box finger 32. Since this music box finger 32 resonates at an audible frequency, a listener will be able to hear the audible sound and determine that the wiper 24 has moved to the end of its stroke. Finger 32 preferably has a different audible frequency than first finger 30, thereby a listener will be able to distinguish between the first audible frequency and the second audible frequency and determine where along the path the wiper is. When motor 2 drives worm gear 20 and wiper 24 to a park position as shown in FIG. 1, pin 26 intersects music box finger 28. Finger 28 is bent, released and then resonates at another audible frequency. This frequency is preferably different than the first two, whereby a listener will be able to distinguish the third from the first two. As a result, a listener will be able to determine the position of the wiper by listening to the audible sounds generated.

In a third embodiment of the present invention as shown in FIG. 5, switch 34 is attached to shaft 36 which in turn drives a lock/unlock mechanism. Switch 34 is triggered by pin 26 upon revolution of helical worm gear 20 which is driven by electromagnetic device 2. Finger 28 is attached to housing 16 such that when pin 26 triggers switch 34, it simultaneously impacts finger 28. As a result, a listener is informed any time that switch 34 is triggered and the lock/unlock mechanism is actuated by the audible sounds emitted from resonating finger 28.

It is envisioned that other embodiments may be contemplated which incorporate positioning the disclosed pin at other locations on the worm gear 20 or on any other component mechanically communicating with the worm gear such as the worm gear segment or a driven pinion gear. The timing of pin may be coordinated such that the pin can be located on another rotational element and can strike a music box finger when a wiper or other accessory moves to a particular position of interest. Furthermore, this device may be utilized on other apparatuses besides wiper assemblies and may be used on any accessory where audible feedback or the position of the accessory is useful to a listener. Lastly, other material and members which resonate at an audible frequency may be used in place of the music box finger; for example, piano wire, polymeric fingers, multiple stamped fingers or abutting gears themselves may provide the desired artificial mechanical sound. The disclosed finger may also be mounted for movement with the worm gear while the plucking projection is fixed to the housing. Various materials have been disclosed in an exemplary fashion, however, other materials may of course be employed. It is intended by the following claims to cover these and any other departures from the disclosed embodiments which fall within the true spirit of this invention.

The invention claimed is:

1. An automotive vehicle apparatus comprising;

an electromagnetic device;

a moveable body operably driven by said electromagnetic device;

an automotive vehicle accessory operably coupled to said movable body;

a member projecting from said movable body; and an elongated and flexible device mechanically emitting an audible sound responsive to contact by said member which is operably caused by movement of said moveable body.

2. The apparatus of claim 1 further comprising a housing surrounding said body and said device, and an intermittent motion mechanism coupled to said movable body, whereby said device emits a pleasing sound indicative of a movement of said intermittent motion mechanism which is audible outside said housing.

3. The apparatus of claim 1, wherein said accessory is a door lock.

4. The apparatus of claim 1, wherein said moveable body is a rotatable gear and said electromagnetic device is an electric motor.

5. The apparatus of claim 1, wherein said device is plucked by said member.

6. The apparatus of claim 1, wherein said apparatus is a window wiper.

7. A motor vehicle feedback apparatus for indicating movement, said apparatus comprising:

an electromagnetic device;

a gear coupled to said electromagnetic device;

a housing, said gear being located in said housing; and a mechanical sound producing device operably emitting a desirable sound audible outside said housing in response to movement of a contacting surface said gear contacting and moving past said mechanical sound producing device.

8. The feedback apparatus as claimed in claim 7, further comprising a movable accessory coupled to said gear, whereby said sound producing device emits a sound indicative of a movement of said accessory.

9. The feedback apparatus as claimed in claim 8, wherein said accessory is a lock.

10. The feedback apparatus as claimed in claim 7, further comprising a protrusion fixed to said gear, said protrusion operably impacting said sound producing device to mechanically emit an audible sound indicative of a position of said gear.

11. The feedback apparatus as claimed in claim 6, wherein said sound producing device is a music box finger.

12. The feedback apparatus as claimed in claim 6, wherein said electromagnetic device is a direct current electric motor.

13. The apparatus of claim 7, further comprising a window wiper operably driven by said electromagnetic device.

14. An automotive vehicle feedback apparatus for providing operating conditions of a rotating body, comprising:

an electric motor having an armature shaft with a worm gear segment;

a stationary first surface;

a rotatable worm gear coupled to said worm gear segment, said worm gear having a second surface movable with said worm gear;

at least one projection extending from one of said surfaces; and a plurality of flexible and operably resonating music box fingers located at positions to operably intersect said at least one projection during rotation of said worm gear, said fingers producing an audible sound when contacted by said projection.

15. The apparatus as claimed in claim 14, wherein at least one of said music box fingers has a different resonant frequency than the remainder of said music box fingers.

16. The apparatus of claim 14, further comprising a window wiper operably driven by said electric motor.

17. The apparatus of claim 14, further comprising a lock operably driven by said electric motor.

18. The apparatus of claim 14, further comprising a motor housing, wherein at least one of said fingers is secured to said stationary first surface which is part of said motor housing.

* * * * *

UNITED STATES PATENT AND TRADEMARK OFFICE
CERTIFICATE OF CORRECTION

PATENT NO. : 6,002,323
DATED : December 14, 1999
INVENTOR(S) : Timothy J. Bomya

It is certified that error appears in the above-identified patent and that said Letters Patent is hereby corrected as shown below:

Column 5, claim 7, line 8, after the word "surface" insert --of--.

Signed and Sealed this

Twelfth Day of September, 2000

Attest:

Q. TODD DICKINSON

*Attesting Officer*       *Director of Patents and Trademarks*